(12) United States Patent
Ochi

(10) Patent No.: US 8,376,105 B2
(45) Date of Patent: Feb. 19, 2013

(54) LOCK-UP CLUTCH MECHANISM

(75) Inventor: Toru Ochi, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/518,659

(22) PCT Filed: Dec. 22, 2009

(86) PCT No.: PCT/JP2009/007095
§ 371 (c)(1),
(2), (4) Date: Jun. 22, 2012

(87) PCT Pub. No.: WO2011/077478
PCT Pub. Date: Jun. 30, 2011

(65) Prior Publication Data
US 2012/0255825 A1    Oct. 11, 2012

(51) Int. Cl.
*F16H 45/02* (2006.01)
(52) U.S. Cl. ............................ 192/3.29; 192/213.2
(58) Field of Classification Search .............. 192/213.2
See application file for complete search history.

(56) References Cited

U.S. PATENT DOCUMENTS

| | | | |
|---|---|---|---|
| 6,273,227 B1 | 8/2001 | Ohkubo | |
| 7,938,239 B2 * | 5/2011 | Heck et al. | 192/3.28 |
| 2004/0060793 A1 | 4/2004 | Dacho et al. | 192/3.29 |
| 2005/0115788 A1 * | 6/2005 | Ackermann et al. | 192/3.29 |
| 2006/0124420 A1 * | 6/2006 | Ackermann | 192/3.29 |
| 2009/0084649 A1 * | 4/2009 | Kombowski et al. | 192/3.29 |
| 2009/0107790 A1 * | 4/2009 | Degler et al. | 192/3.29 |

FOREIGN PATENT DOCUMENTS

| | | |
|---|---|---|
| JP | 7 4497 | 1/1995 |
| JP | 2000 266158 | 9/2000 |
| JP | 2002 21973 | 1/2002 |
| JP | 2002 81521 | 3/2002 |
| JP | 2005 265021 | 9/2005 |
| JP | 2006 77966 | 3/2006 |
| JP | 2007 292134 | 11/2007 |
| JP | 2007 333074 | 12/2007 |
| JP | 2008 190561 | 8/2008 |
| JP | 2009 243536 | 10/2009 |

OTHER PUBLICATIONS

International Search Report Issued Feb. 23, 2010 in PCT/JP09/07095 Filed Dec. 22, 2009.

* cited by examiner

*Primary Examiner* — Rodney Bonck
(74) *Attorney, Agent, or Firm* — Oblon, Spivak, McClelland, Maier & Neustadt, L.L.P.

(57) ABSTRACT

Disclosed is a lock-up clutch mechanism which is simple in construction but can increase the rigidity and the heat capacity of the lock-up piston, can lighten the lock-up piston, can suppress the temperature of a second sliding surface from being raised to enhance the heat resistance of the second friction member. The lock-up clutch mechanism is provided with a connecting member for connecting a lock-up piston with a center plate of a damper mechanism. The connecting member has a drum portion extending in the axial direction of an input shaft and splined to the radially outer peripheral portion of a center plate, and a hollow disc plate portion integrally connected with the axial end portion of the drum portion and radially inwardly extending from the axial end portion of the drum portion. The hollow disc plate portion is further in face-to-face relationship with the sliding surface of the lock-up piston across the lock-up piston.

5 Claims, 8 Drawing Sheets

LOCK-UP CLUTCH MECHANISM

TECHNICAL FIELD

The present invention relates to a lock-up clutch mechanism, and more particularly to a lock-up clutch mechanism provided with a lock-up piston connected to a cover member forming part of a fluid transmission apparatus through the multi-plate clutch.

BACKGROUND ART

There has so far been known an automatic transmission of a vehicle such as an automotive vehicle and the like each of which is provided with a fluid transmission apparatus represented by a torque convertor capable of transmitting the rotation of an engine to an input shaft of the automatic transmission.

The conventional torque convertor comprises a pump impeller, a turbine runner, and a stator secured to a housing forming part of the automatic transmission through a one-way clutch. The pump impeller, the turbine runner and the stator are each provided with vanes which are soaked in oil, i.e., operating fluid serving as a medium to transmit the torque of an engine to an input shaft of the automatic transmission.

The torque convertor can absorb the torque fluctuation of the engine before transmitting the torque of the engine to the transmission, whereas has a drawback such as transmission loss caused by the operating fluid sealed in the torque convertor, thereby giving rise to the decrease in fuel consumption efficiency.

In view of this drawback, the torque convertor is generally constructed to be assembled with a lock-up clutch capable of integrally connecting the pump impeller and the turbine runner in a high rotation range of the engine smaller in torque fluctuation.

The lock-up clutch of this kind is disposed in face-to-face relationship with a front cover for transmitting the rotation of the engine to the pump impeller. The lock-up clutch is provided with a lock-up piston in a disc shape which is to be pressed against the inner peripheral surface of the front cover by the difference of the pressures of the operating oil in an engagement side oil chamber and a release side oil chamber, so that when the lock-up piston is pressed against and thus brought into engagement with the front cover, the rotation of the engine is directly transmitted to the input shaft of the automatic transmission.

Between the front cover and the lock-up piston is disposed a single plate clutch which has a friction material provided on one side surface of the front cover or the lock-up piston, a sliding surface provided on the other side surface of the front cover or the lock-up piston to face the friction material and slidably contactable with the friction material.

In this type of single clutch having a single sliding surface, it is required to have the area of the sliding surface increased for the purpose of increasing torque capacity of the lock-up clutch mechanism when the lock-up piston is coupled with the front cover. The sliding surface thus increased results in increasing the radial size of the lock-up piston, and thus leading to making the lockup mechanism enlarged in size.

In order to improve the point as previously mentioned, known is another lock-up clutch mechanism which is provided with a multi-plate clutch as shown in FIGS. 7, 8 (for example see Patent Document 1). The known lock-up clutch mechanism 1 is shown in FIGS. 7, 8 to be provided with a lock-up piston 2. Between the lock-up piston 2 and a front cover 3 facing the lock-up piston 2 is provided a multi-plate clutch 4.

The multi-clutch 4 comprises a clutch plate 6 splined to an outer diameter drum portion 5 mounted integrally formed with the front cover 3 and having both axial side surfaces respectively affixed with friction materials 6a, 6b, and a clutch plate 8 splined to a drum portion 7 integrally formed with the lock-up piston 2 and having one axial side surface affixed with a friction material 8a.

The front cover 3 has an inner peripheral surface having a sliding surface 3a frictionally sliding with the friction material 8a, while the lock-up piston 2 has one side surface having a sliding surface 2a frictionally sliding with the friction material 6b. The clutch plate 8 has one side surface having a sliding surface 8b frictionally sliding with the friction material 6a. The multi-plate clutch 4 is therefore constructed to have three sliding surfaces.

The lock-up clutch mechanism 1 having such a multi-plate clutch 4 can be constructed to have the sliding area enlarged when the lock-up piston 2 is pressed against the front cover 3, so that the torque capacity of the lock-up clutch mechanism 1 can be increased, thereby making it possible to diminish the radial size of the lock-up piston 2, and thereby to downsize the lock-up clutch mechanism 1.

In recent years, it has been paid much consideration that the lock-up clutch mechanism is retained in a connected state as far as possible even in a driving area with a relatively large torque fluctuation of the engine in order to further improve fuel consumption and other efficiencies of the engine.

From this point of view, the lock-up piston and the front cover are not fully integrally connected, but instead are pressed against each other in what is called a half-clutch state to achieve a slip control (see for example Patent Document 2). However, the lock-up clutch mechanism thus constructed is subjected to frictional heat generated by the sliding frictions between the friction materials if there are many opportunities in the slip control that the friction materials are brought into friction engagement with the sliding surfaces.

When the slip control to be performed by the lock-up clutch mechanism 1 as shown in FIGS. 7, 8 is considered, the frictional heat is generated between the friction material 8a and the sliding surface 3a of the front cover 3, between the friction material 6b and the sliding surface 2a of the lock-up piston 2, and between the friction material 6a and the sliding surface 8b of the clutch plate 8.

In general, the friction heat generated between the friction material 8a and the sliding surface 3a of the front cover 3 are easily absorbed by the front cover 3 having large torque capacity, however, the friction heat generated between the friction material 6b and the sliding surface 2a of the lock-up piston 2 is difficult to be absorbed because the heat capacity of the lock-up piston 2 is not so large compared with that of the front cover 3.

Therefore, the multi-clutch 4 encounters such a problem that the heat resistance of the friction material 6b is reduced, and thus is deteriorated earlier. For this reason, it is difficult to expand the slip range and to improve the fuel consumption in a wide driving area.

In order to solve these problems, it may be considered that the friction material is formed with a plurality of cooling grooves extending in the radial direction of the friction material and spaced apart from each other in the circumferential direction of the friction material to ensure that the operating oil introduced into the release side oil chamber from the engagement side oil chamber is allowed to flow in the cooling grooves to cool the friction material when the lock-up piston is pressed against the front cover in the half-clutch state (see for example Patent Document 3).

CITATION LIST

Patent Literature

{PTL 1}
Patent Document 1: Japanese Patent Application Publication No. H07-004497
{PTL 2}
Patent Document 2: Japanese Patent Application Publication No. 2007-333074
{PTL 3}
Patent Document 3: Japanese Patent Application Publication No. 2008-190561

SUMMARY OF INVENTION

Technical Problem

However, the conventional lock-up clutch mechanism is constructed to have the friction materials formed with such cooling grooves, so that the friction materials of the multi-plate clutch formed with such cooling grooves have only flat engageable surfaces excluding the cooling grooves, thereby resulting in diminishing the sliding surface of the friction materials, and thereby diminishing the torque capacity of the lock-up clutch mechanism.

The type of the lock-up clutch mechanism having the friction materials formed with the cooling grooves is applied to a torque converter having the engagement side oil chamber and the release side oil chamber separated from each other by the lock-up piston to prevent the operating oil from being introduced into the release side oil chamber from the engagement side oil chamber when the lock-up piston is pressed against the front cover.

This is due to the fact that the engagement side oil chamber and the release side oil chamber held in communication with each other through the lock-up piston causes the operating oil to be introduced into the release side oil chamber from the engagement side oil chamber when the lock-up piston is pressed against the front cover, thereby leading to difficulties in generating the difference of the pressures of the operating oil between the engagement side oil chamber and the release side oil chamber for the purpose of allowing the lock-up piston to take the coupling state or the half-clutch state. Further, the half-clutch state causes the sliding surface to slip, so that a small amount of operating oil is fed to the friction materials, however, is equivalent to the amount to have the friction materials smoothly slip, and is not sufficient for cooling the friction materials.

For this reason, the torque converter constructed to have the engagement side oil chamber and the release side oil chamber held in communication with each other by the lock-up piston is required to generate the difference of the pressures of the operating oil between the engagement side oil chamber and the release side oil chamber with the lock-up piston and the front cover sealed therebetween by the friction material, thereby making it difficult to form the cooling grooves in the friction material. The conventional torque converter previously mentioned may be applied to a torque convertor which has the engagement side oil chamber and the release side oil chamber not held in communication with each other, however, in this case it is possible only to set shallow cooling grooves allowing the operating oil not to introduced therethrough.

On the other hand, the lock-up piston is generally in a disc shape and radially long. In the lock-up clutch mechanism disclosed in the Patent Document 2, the lock-up piston is deflected by the difference of the pressures of the operating oil between the engagement side oil chamber and the release side oil chamber when the lock-up piston is pressed against the front cover through the multi-plate clutch.

Therefore, there is a possibility that the friction material is similarly deformed together with the deformation of the lock-up piston, thereby preventing the whole area of the friction material from being brought into sliding contact with the other sliding surfaces, and thereby diminishing the torque capacity of the friction material. The whole surfaces of the friction material cannot be in sliding contact with the sliding surfaces, thereby causing a possibility that the heat generation is concentrated in a narrow range.

To solve these problems, it is possible to have the lock-up piston made to have a large thickness to boost the rigidity of the lock-up piston. The large thickness of the lock-up piston leads to the increased weight of the lock-up piston, thereby resulting in causing such a problem that the weight of the lock-up clutch mechanism is increased concomitantly with the increased weight of the lock-up piston.

The present invention has been made to solve the conventional various problems as previously mentioned, and it is therefore an object of the present invention to provide a lock-up clutch mechanism which is simple in construction, can increase the rigidity and the heat capacity of the lock-up piston, can lighten the lock-up piston, can suppress the temperature of a second sliding surface from being raised, and can enhance the heat resistance of a second friction member.

Solution to Problem

In order to solve the above problems, (1) a lock-up clutch mechanism according to the present invention is provided in a fluid transmission device comprising a pump impeller connected with an output shaft of a driving source through a cover member, a turbine runner disposed in face-to-face relationship with the pump impeller and connected with an input shaft forming part of a driven side member, and a damper mechanism having a first damper plate connected with the turbine runner, and a second damper plate connected with the first damper plate through a resilient member and relatively rotatable with the first damper plate in the state of the resilient member compressed, the lock-up clutch mechanism intervening between the cover member and the second damper plate and comprising: a lock-up piston formed in a disc shape and movable toward and away from the cover member in the axial direction of the input shaft, a multi-plate clutch disposed between a first sliding surface formed on the inner peripheral surface of the cover member and a second sliding surface formed on one side surface of the lock-up piston, the multi-plate clutch having one or more clutch plates including a first friction member frictionally slidable with the first sliding surface and a second friction member frictionally slidable with the second sliding surface, the multi-plate clutch being formed with no less than two sliding surfaces between the inner peripheral surface of the lock-up piston and the one side surface of the cover member, and a connecting member for connecting the lock-up piston and the second damper plate, the connecting member having a connecting portion connected with the second damper plate and extending from the connecting portion to the other side surface of the lock-up piston, and the connecting member being partly in face-to-face relationship with the second sliding surface across the lock-up piston.

The lock-up clutch mechanism has a connecting member for connecting the lock-up piston and the second damper plate, the connecting member having a connecting portion connected with the second damper and extending from the connecting portion to the other side surface of the lock-up piston, the connecting member being partly in face-to-face relationship with the second sliding surface across the lock-up piston. The lock-up clutch mechanism according to the present embodiment thus constructed can be simple in construction and can increase the heat capacity of the lock-up piston only with the connecting member employed to connect the lock-up piston with the second damper plate of the damper mechanism.

For this reason, the frictional heat generated on the second sliding surface can be absorbed by the cover member with a large heat capacity when the lock-up piston is pressed against the cover member through the multi-plate clutch, and can increase the absorption amount of heat on the second sidling surface of the lock-up piston.

The lock-up clutch mechanism according to the present invention can reinforce the lock-up piston with the connecting member to increase the rigidity of the lock-up piston, and thereby can suppress the lock-up piston from being deformed when the lock-up piston is pressed against the cover member through the multi-plate clutch. As a consequence, the second friction member and the second sliding surface can entirely be brought into sliding contact with each other, thereby making it possible to promptly transmit to the connecting member the heat generated on the second sliding surface. This means that the heat generated on the second sliding surface can be suppressed from being raised, thereby making it possible to enhance the heat resistance of the second friction member as well as to prevent the second friction member from being deteriorated earlier.

Further, the lock-up clutch mechanism according to the present invention can reinforce the lock-up piston with the connecting member to prevent the lock-up piston from being deformed, and thereby can make unnecessarily the rigidity of the lock-up piston to be increased by a method of increasing the thickness of the lock-up piston, and can prevent the weight of the lock-up piston from being increased. This leads to the fact that the lock-up clutch device can not only be lightened but also be reduced in production cost.

In addition, the lock-up clutch mechanism according to the present invention can increase the rigidity of the lock-up piston, thereby enabling the first friction material and the first sliding surface, and the second friction material and the second sliding surface to be entirely brought into sliding contact with one another, and thereby increasing the torque capacity of the lock-up clutch mechanism. As consequence, the slip area to allow the lock-up clutch to be pressed against the cover member in the half-clutch state can be expanded, thereby improving the fuel consumption in the wide driving area.

In the lock-up clutch mechanism as set forth in the above definition (1), (2) the connecting member has a cylindrical portion extending in the axial direction of the input shaft to partly constitute the connecting portion splined to the radially outer peripheral portion of the second damper plate, and a hollow disc plate portion integrally formed with the axial end portion of the cylindrical portion and radially inwardly extending from the axial end portion of the cylindrical portion, the hollow disc plate portion being in face-to-face relationship with the second sliding surface across the lock-up piston.

The lock-up clutch mechanism constructed as set forth in the above definition (2) can increase the heat capacity with the connecting member having the hollow disc plate portion and the cylindrical portion, thereby making it possible to increase the absorption amount of heat generated on the second sliding surface.

The lock-up clutch mechanism according to the present invention can increase the rigidity of the lock-up piston by reinforcing the lock-up piston with the hollow disc plate portion, and thereby can suppress the lock-up piston from being deformed when the lock-up piston is pressed against the cover member. Due to the fact that the cylindrical portion is splined to the radially outer peripheral portion of the second damper plate, the lock-up piston can reliably axially be moved with respect to the damper mechanism.

In the lock-up clutch mechanism as set forth in the above definition (2), (3) the whole surface of the hollow disc plate portion is joined to the other side surface of the lock-up piston by a joining member.

The lock-up clutch mechanism thus constructed can have the whole surface of the hollow disc plate portion joined to the other side surface of the lock-up piston by the joining member, thereby making it possible to increase the heat transmission area to the hollow disc plate portion from the second sliding surface, and thereby to even further suppress the temperature of the second sliding surface from being raised.

Another lock-up clutch mechanism according to the present invention is provided in a fluid transmission device comprising: (4) a pump impeller connected with an output shaft of a driving source through a cover member, a turbine runner disposed in face-to-face relationship with the pump impeller and connected with an input shaft forming part of a driven side member, and a damper mechanism having a first damper plate connected with the turbine runner, and a second damper plate connected with the first damper plate through a resilient member and relatively rotatable with the first damper plate in the state of the resilient member compressed, the lock-up clutch mechanism intervening between the cover member and the second damper plate and comprising: a lock-up piston formed in a disc shape and movable toward and away from the cover member in the axial direction of the input shaft, a multi-plate clutch disposed between a first sliding surface formed on the inner peripheral surface of the cover member and a second sliding surface formed on one side surface of the lock-up piston, the multi-plate clutch having one or more clutch plates including a first friction member frictionally slidable with the first sliding surface and a second friction member frictionally slidable with the second sliding surface, the multi-plate clutch being formed with no less than two sliding surfaces between the inner peripheral surface of the lock-up piston and the one side surface of the cover member, and a connecting member for connecting the lock-up piston and at least one or more clutch plates, the connecting member having a connecting portion connected with the clutch plate and extending from the connecting portion to the one side surface of the lock-up piston to form the second sliding surface frictionally slidable with the second friction member.

The lock-up clutch mechanism has a connecting member for connecting the lock-up piston and the clutch plate, the connecting member having a connecting portion connected with the clutch plate and extending from the connecting portion to the one side surface of the lock-up piston to form the second sliding surface frictionally slidable with the second friction member. The lock-up clutch mechanism according to the present embodiment thus constructed can be simple in construction and can increase the heat capacity of the lock-up piston only with the connecting member employed to connect the lock-up piston with the clutch plate.

For this reason, the frictional heat generated on the first sliding surface can be absorbed by the cover member with a large heat capacity when the lock-up piston is pressed against the cover member through the multi-plate clutch, and can increase the absorption amount of heat on the second sidling surface of the lock-up piston.

The lock-up clutch mechanism according to the present invention can reinforce the lock-up piston with the connecting member to increase the rigidity of the lock-up piston, and thereby can suppress the lock-up piston from being deformed when the lock-up piston is pressed against the cover member through the multi-plate clutch. As a consequence, the second friction member and the second sliding surface can entirely be brought into sliding contact with each other, thereby making it possible to promptly transmit to the connecting member the heat generated on the second sliding surface. This means that the heat generated on the second sliding surface can be suppressed from being raised, thereby making it possible to enhance the heat resistance of the second friction member as well as to prevent the second friction member from being deteriorated earlier.

Further, the lock-up clutch mechanism according to the present invention can reinforce the lock-up piston with the connecting member to prevent the lock-up piston from being deformed, and thereby can make unnecessarily the rigidity of the lock-up piston to be increased by a method of increasing the thickness of the lock-up piston, and can prevent the weight of the lock-up piston from being increased. This leads to the fact that the lock-up clutch device can not only be lightened but also be reduced in production cost.

In addition, the lock-up clutch mechanism according to the present invention can increase the rigidity of the lock-up piston, thereby enabling the first friction material and the first sliding surface, and the second friction material and the second sliding surface to be entirely brought into sliding contact with one another, and thereby increasing the torque capacity of the lock-up clutch mechanism. As consequence, the slip area to allow the lock-up clutch to be pressed against the cover member in the half-clutch state can be expanded, thereby improving the fuel consumption in the wide driving area.

In the lock-up clutch mechanism as set forth in the above definition (4), (5) the connecting member has a cylindrical portion extending in the axial direction of the input shaft to partly constitute the connecting portion splined to the radially outer peripheral portion of at least one or more clutch plates, and a hollow disc plate portion integrally formed with the axial end portion of the cylindrical portion and radially inwardly extending from the axial end portion of the cylindrical portion to have the second sliding surface.

The lock-up clutch mechanism according to the present embodiment thus constructed can increase the heat capacity of the lock-up piston with the connecting member having the hollow disc plate portion and the cylindrical portion, thereby making it possible to increase the absorption amount of heat generated on the second sliding surface.

The lock-up clutch mechanism according to the present invention can reinforce the lock-up piston with the hollow disc plate portion to increase the rigidity of the lock-up piston, and thereby can suppress the lock-up piston from being deformed when the lock-up piston is pressed against the cover member through the multi-plate clutch. Due to the fact that the cylindrical portion is splined to the radially outer peripheral portion of the clutch plate, the clutch plate can reliably axially be moved with respect to the lock-up piston.

In the lock-up clutch mechanism as set forth in the above definition (5), (6) the whole surface of the hollow disc plate portion is joined to the one side surface of the lock-up piston by a joining member.

The lock-up clutch mechanism thus constructed can have the whole surface of the hollow disc plate portion joined to the one side surface of the lock-up piston by a joining member, thereby making it possible to increase the heat transmission area to the hollow disc plate portion from the connecting member, and thereby to even further suppress the temperature of the second sliding surface from being raised. In the lock-up clutch mechanism as set forth in the above definitions (4) to (6), (7) the connecting member is splined to the clutch plate having the first friction member. The lock-up clutch mechanism thus constructed can have the connecting member splined to the clutch plate having the first friction material, thereby making it possible to bring the lock-up piston into frictionally sliding engagement with the cover member through the clutch plate having the first friction material, and to have the lock -up piston slip reliably against the cover member.

Advantageous Effects of Invention

The present invention can provide a lock-up clutch mechanism which is simple in construction but can increase the rigidity and the heat capacity of the lock-up piston, can lighten the lock-up piston, and can suppress the temperature of the second sliding surface from being raised to enhance the heat resistance of the second friction member.

DESCRIPTION OF EMBODIMENTS

The embodiments of the lock-up clutch mechanism according to the present invention will be described hereinafter with reference to the accompanying drawings.

(First Embodiment)

Figure 1:
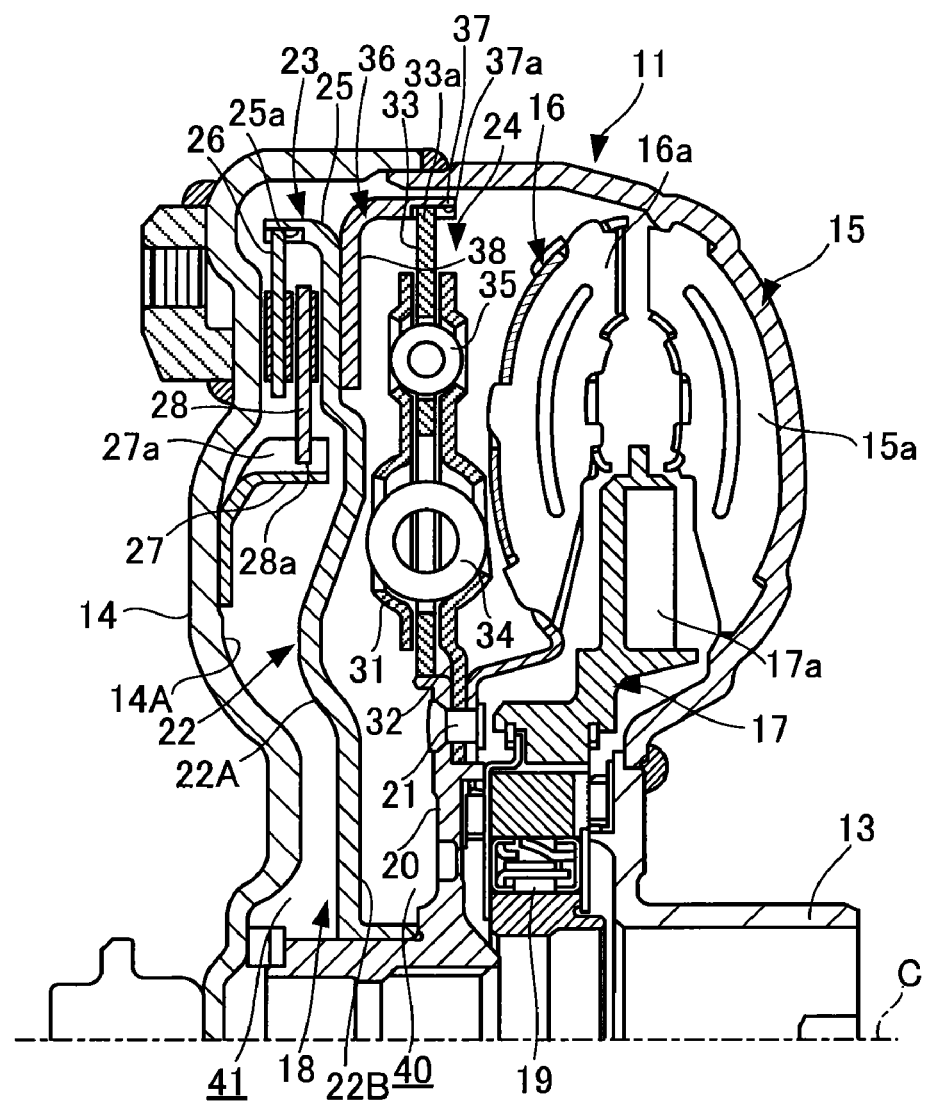
FIG. 1 shows a first embodiment of a lock-up clutch mechanism according to the present invention, and is a cross-sectional view of a torque convertor provided with a lockup mechanism.
Figure 2:
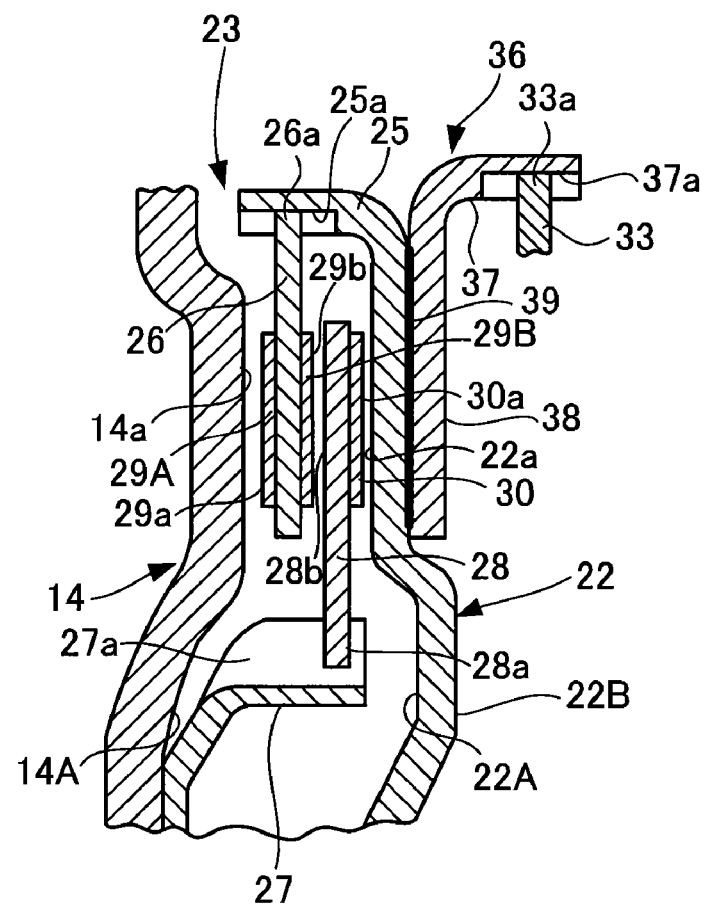
FIG. 2 shows the first embodiment of the lock-up clutch mechanism according to the present invention, and is a cross-sectional view of a multi-plate clutch forming part of the lock-up clutch mechanism.
Figure 3:
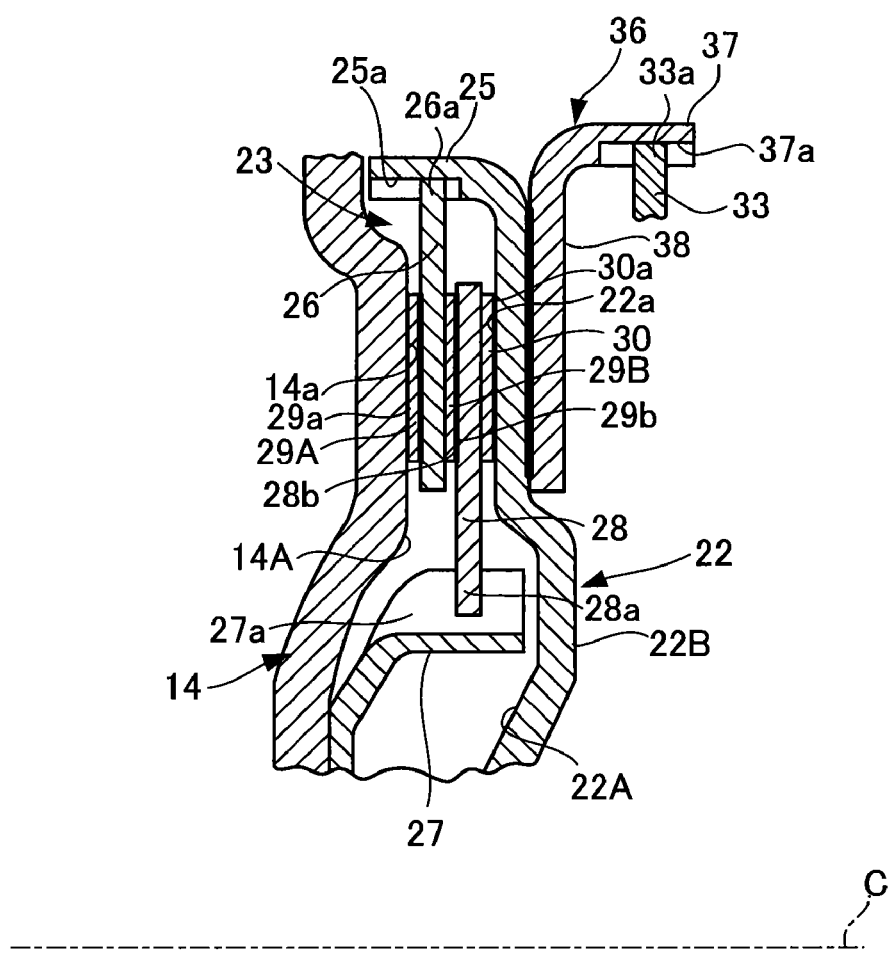
FIG. 3 shows the first embodiment of the lock-up clutch mechanism according to the present invention, and a view showing the multi-plate clutch with the lock-up clutch being pressed against a front cover.

FIGS. 1 to 3 are views showing a first embodiment of the lock-up clutch mechanism according to the present invention.

Firstly, the construction of this embodiment will be explained hereinafter.

FIG. 1 shows a torque convertor 11 forming part of an automatic transmission to be mounted on a vehicle such as an automotive vehicle and the like. The torque convertor 11 is constructed to be accommodated in a transmission cover not shown forming part of the automatic transmission. The automatic transmission is provided between an engine serving as a driving source not shown and driving wheels to transmit the output of the engine to the driving wheels. The torque convertor 11 shown is constructed in symmetrical relationship with respect to an axial direction C, i.e., the axis of the torque convertor 11, so that only the upper half of the torque convertor 11 is shown but the lower half of the torque convertor 11 is omitted in FIG. 1.

The torque convertor 11 is adapted to transmit the rotation of the engine to an input shaft 13, forming a driven side part of the transmission not shown, through operating oil filled in the torque convertor 11. The torque convertor 11 is constructed to include a front cover 14 forming a cover member, a pump impeller 15, a turbine runner 16, a stator 17, and a lock-up clutch device 18 functioning as a lock-up clutch mechanism.

The front cover 14 is connected with a crank shaft serving as an output shaft not shown to transmit the output of the engine to the torque convertor 11, so that the front cover 14 can be rotated together with the crank shaft around the axial direction C, and thus has a rotation number the same as that of the crank shaft.

The pump impeller 15 is connected with the front cover 14, and thus is adapted to be rotated together with the front cover 14 around the axial direction C when the front cover 14 is driven to rotate.

When the pump impeller 15 is rotated, the operating oil filled in the pump impeller 15 is driven radially outwardly by a centrifugal force generated when the operating oil is rotated while being pressed by the vanes 15a formed in the impeller 15.

The operating oil is designed to impinge on vanes 16a forming part of the turbine runner 16 disposed in face-to-face relationship with the pump impeller 15. The operating oil impinged against the vanes 16a of the turbine runner 16 causes an impact strength which forces the turbine runner 16 to rotate, and thereafter flow along the curved surface of the vanes 16a of the turbine runner 16. The operating oil is returned to the pump impeller 15 through a stator 17 to be circulated within the torque convertor The stator 17 is provided with a one-way clutch 19, and arranged between the pump impeller 15 and the turbine runner 16. In the event that there is a relative rotation difference between the pump impeller 15 and the turbine runner 16 in the state of the pump impeller 15 starting to be rotated, the flow of the operating oil discharged from the turbine runner 16 is formed against the rotation of the pump impeller 15, however, the stator 17 functions to convert the flow of the operating oil discharged from the turbine runner 16 under the influence of the vanes 17a of the pump impeller 17 in a direction to assist the flow in the pump impeller 15.

When, on the other hand, the rotational speed of the turbine runner 16 is increased to reduce the relative rotation difference between the pump impeller 15 and the turbine runner 16, the flow of the operating oil discharge from the turbine runner 16 is inversely formed against the rotation of the pump impeller 15, however, the stator 17 functions to prevent the operating oil discharged from the turbine runner 16 from flowing in a direction having the rotation of the pump impeller 15 hindered.

The input shaft 13 is splined to a turbine hub 20 securely connected with the turbine runner 16 through rivets 21. This means that the rotation of the turbine runner 16 is transmitted to the input shaft 13 through the turbine hub 20 when the turbine runner 16 is rotated as previously mentioned.

The lock-up clutch device 18 is positioned in the torque convertor 11 in juxtaposed relationship with the front cover 14, and securely connected with the turbine hub 20 through rivets 21. The lock-up clutch device 18 is constructed with the lock-up piston 22, the multi-plate clutch 23 and the damper mechanism 24.

The lock-up piston 22 is formed in a disc shape, and has an inner peripheral portion snugly fitted with the turbine hub 20 by oil seals. Further, the lock-up piston 22 is slidable toward and away from the front cover 14 in the axial direction C of the input shaft 13.

As shown in FIGS. 1, 2, the lock-up piston 22 has a radially outer peripheral portion formed with an outer peripheral drum portion 25 projecting toward the front cover 14 and having an inner peripheral portion formed with a spline portion 25a.

Radially inwardly of the outer peripheral drum portion 25 is provided an annular clutch plate 26 which has a radially outer peripheral portion formed with a spline portion 26a held in spline engagement with the spline portion 25a of the outer peripheral drum portion 25. This means that the clutch plate 26 is prohibited from being relatively rotated with, viz., rotated together with the lock-up piston 22, but is axially slidable with respect to the lock-up piston 22.

The front cover 14 has an inner peripheral surface securely connected to an inner peripheral drum portion 27 which is positioned radially inwardly of the outer peripheral drum portion 25, and has an outer peripheral portion formed with a spline portion 27a.

Radially outwardly of the inner peripheral drum portion 27 is provided an annular clutch plate 28 which has a radially inner peripheral portion formed with a spline portion 28a held in spline engagement with the spline portion 27a of the inner peripheral drum portion 27. This means that the clutch plate 28 is prohibited from being relatively rotated with, viz., rotated together with the front cover 14, but is axially slidable with respect to the front cover 14.

As shown in FIG. 2, the clutch plates 26, 28 are positioned between one side surface 22A of the lock-up piston 22 and the inner peripheral surface 14A of the front cover 14 and facing each other in the axial direction C of the input shaft 13.

As shown in FIG. 2, the clutch plate 26 has both axial surfaces having friction materials 29A, 29B respectively affixed thereto, while the clutch plate 28 also has an axial side surface facing the lock-up piston 22 and having a friction material 30 affixed thereto.

The inner peripheral surface 14A of the front cover 14 facing the friction material 29A and having a sliding surface 14a which is contactable with a sliding surface 29a of the friction material 29A.

The clutch plate 28 has one axial side surface facing the friction material 29B and having a sliding surface 28b which is contactable with a sliding surface 29b of the friction material 29B.

The one side surface 22A of the lock-up piston 22 facing the friction material 30 has a sliding surface 22a which is contactable with a sliding surface 30a of the friction material 30.

Returning to FIG. 1, the damper mechanism 24 comprises a pair of cushion plates 31, 32 serving as a first damper plate, a center plate 33 sandwiched between the cushion plates 31, 32 and serving as a second damper plate, and coil springs 34, 35 between the cushion plates 31, 32 and the center plate 33.

The cushion plate 32 is secured to the turbine hub 20 and the turbine runner 16 by rivets 21, while the cushion plate 31 is secured to the cushion plate 32 by rivets not shown. The center plate 33 is formed with a plurality of hollow portions circumferentially extending and equally spaced from each other, and respectively accommodating the coil springs 34, 35.

The cushion plates 31, 32 is formed with a plurality of opening windows respectively facing the hollow portions of the center plate 33, and thus circumferentially extending and equally spaced from each other. When the center plate 33 is rotated, the cushion plates 31, 32 allow the circumferential one end portions or the circumferential other end portions of the opening windows to be brought into pressing contact with the coil springs 34, 35, thereby making it possible to integrally rotate the cushion plates 31, 32 and the center plate 33.

The lock-up piston 22 and the damper mechanism 24 are connected with each other by a connecting member 36. The connecting member 36 has a drum portion 37 and a hollow disc plate portion 38. The drum portion 37 extends in the axial direction C of the input shaft 13 and forms a cylindrical portion partly forming a connecting portion, while the hollow disc plate portion 38 integrally connected with the axial end portion of the drum portion 37 and radially inwardly extending from the drum portion 37. The drum portion 37 has an inner peripheral portion formed with a spline portion 37a.

The center plate 33 has a radially outer peripheral portion formed with a spline portion 33a which is splined to the spline portion 37a of the drum portion 37. This means that the lock-up piston 22 is prohibited from being relatively rotated with the damper mechanism 24, viz., rotatable together with the damper mechanism 24, but is only axially slidable with respect to the damper mechanism 24.

At the other side surface 22B of the lock-up piston 22 is formed an engagement side oil chamber 40, while between the inner peripheral surface 14A of the front cover 14 and the one side surface 22A of the lock-up piston 22 is formed a release side oil chamber 41. The engagement side oil chamber 40 and the release side oil chamber 41 are adapted to be supplied with the operating oil from a hydraulic pressure supplying device not shown in the drawings.

The lock-up piston 22 is adapted to receive the operating oil and move toward the front cover 14 in response to the operating oil supplied to the engagement side oil chamber 40, while the operating oil is discharged from the release side oil chamber 41 in response to the movement of the lock-up piston 22 toward the front cover 14.

In response to the movement of the lock-up piston 22, the lock-up piston 22 is pressed against the front cover 14 through the multi-plate clutch 23, while the sliding surface 29a of the friction material 29A and the sliding surface 14a of the front cover 14, the sliding surface 29b of the friction material 29B and the sliding surface 28b of the clutch plate 28, and the sliding surface 30a of the friction material 30 and the sliding surface 22a of the lock-up piston 22 are being brought into frictional sliding contact with one another as shown in FIG. 3.

As will be understood from the foregoing description, the multi-plate clutch 23 in the present embodiment has three sliding surfaces. The sliding surface 14a of the front cover 14 constitutes a first sliding surface, while the sidling surface 22a of the lock-up piston 22 constitutes a second sliding surface as defined in the present invention.

If the axial end portion of the outer peripheral drum portion 25 comes to be into engagement with the front cover 14 before the sliding surface 29a of the friction material 29A and the sliding surface 14a of the front cover 14 are brought into frictional sliding contact with one another when the lock-up piston 22 pressed against the front cover 14 through the multi-plate clutch 23, there is a possibility that the sliding surface 29a of the friction material 29A and the sliding surface 14a of the front cover 14 are not brought into frictional sliding contact with one another For this reason, the front cover 14 is formed to have a portion projecting toward the lock-up piston 22 and formed with the sliding surface 14a, thereby making it possible to prevent the axial end portion of the outer peripheral drum portion 25 from being brought into engagement with the front cover 14 when the sliding surface 29a of the friction material 29A and the sliding surface 14a of the front cover 14 are brought into frictional sliding contact with one another.

When the lock-up piston 22 is pressed against the front cover 14 through the multi-plate clutch 23, the front cover 14 is directly connect with the lock-up piston 22 and thus integrally rotatable with the lock-up piston 22, thereby making it possible to transmit the rotation torque of the engine to the input shaft 13 from the lock-up piston 22 through the damper mechanism 24 and the turbine hub 20. As a consequence, the crank shaft of the engine is directly connected with the input shaft 13 through the lock-up clutch device 18.

In the event that the torque fluctuation of the engine is increased in the lockup state established by the lock-up clutch device 18, the cushion plates 31, 32 and the center plate 33 are relatively rotated with each other to force the coil springs 34, 35 to be compressed and deformed, thereby increasing a torsion angle formed between the cushion plates 31, 32 and the center plate 33.

The damper mechanism 24 can absorb the torque fluctuation transmitted to the input shaft 13 from the lock-up piston 22 through the turbine hub 20, thereby making it possible to reduce the torque fluctuation to be transmitted to the input shaft 13 from the engine.

When, on the other hand, the lockup state is released, the operating oil is adapted to be supplied to the release side oil chamber 41 from the hydraulic pressure supplying device to decrease the pressure of the operating oil in the engagement side oil chamber 40, thereby making it possible to have the lock-up piston 22 spaced apart from the front cover 14.

It will therefore be understood that the lock-up clutch device 18 is adapted to have the lock-up piston 22 selectively connected with or released from the front cover 14 in response to the difference between the pressures of the operating oil in the engagement side oil chamber 40 and the release side oil chamber 41. Further, the difference between the pressures of the operating oil in the engagement side oil chamber 40 and the release side oil chamber 41 can be adjusted to have the lock-up piston 22 not fully integrally engaged with the front cover 14 but pressed against the front cover 14 in what is called a half-clutch state, viz., performing a slip control.

On the other hand, the whole surface of the back side of the hollow disc plate portion 38 is joined together with the other side surface 22B of the lock-up piston 22 facing the sliding surface 22a across the lock-up piston 22 by a joining member 39 such as brazing, welding and other bonding materials. The hollow disc plate portion 38 is held in face-to-face relationship with the sliding surface 22a across the lock-up piston 22 as shown in FIG. 2.

The connecting member 36 in the present embodiment is constructed to have a hollow disc plate portion 38 extending from the spline portion 37a of the drum portion 37 held in spline engagement with the spline portion 33a of the center plate 33 to the other side surface 22B of the lock-up piston 22 facing the sliding surface 22a.

Next, the operation of the lock-up clutch mechanism will be explained hereinafter. In order to improve the fuel consumption and other efficiencies of the engine, the slip control is carried out by pressing the lock-up piston 22 against the front cover 14 in the half-clutch state in the driving area with a relatively large torque fluctuation of the engine. In this case, the operating oil is supplied by the hydraulic pressure supplying device to perform the hydraulic control to increase the difference of the pressures of the operating oil in the engagement side oil chamber 40 and the release side oil chamber 41. At this time, the lock-up piston 22 is adapted to move toward the front cover 14.

At this time, the clutch plates 26, 28 are moved in the axial direction C with respect to the outer peripheral drum portion 25 and the inner peripheral drum portion 27, respectively, to have the sliding surface 29a of the friction material 29A and the sliding surface 14a of the front cover 14, the sliding surface 29b of the friction material 29B and the sliding surface 28b of the clutch plate 28, and the sliding surface 30a of the friction material 30 and the sliding surface 22a of the lock-up piston 22 brought into frictional sliding contact with one another, so that the lock-up piston 22 can be pressed against the front cover 14 through the multi-plate clutch 23.

At this time, the operating oil in the release side oil chamber is controlled to ensure that the multi-plate clutch 23 causes the front cover 14 and the lock-up piston 22 to be coupled with each other in the half-clutch state, and thus causes the front cover 14 and the lock-up piston 22 to be integrally rotated, thereby making it possible to have the engine and the input shaft 13 directly connected with each other without the torque convertor 11, and thereby to improve the fuel consumption.

At this time, the frictional heat is generated on the sliding surface 14a of the front cover 14 frictionally sliding with the friction material 29A, the sliding surface 28b of the clutch plate 28 frictionally sliding with the friction material 29B, and the sliding surface 22a of the lock-up piston 22 frictionally sliding with the friction material 30.

The multi-plate clutch 23 in the present embodiment has three sliding surfaces, thereby resulting in the frictional heat being large in comparison with the conventional single plate clutch.

The frictional heat generated on the sliding surface 14a of the front cover 14 can be absorbed by the front cover 14 with a large heat capacity, while the frictional heat generated on the sliding surface 28b of the clutch plate 28 can be absorbed by the front cover 14 through the inner peripheral drum portion 27.

In contrast, the lock-up piston 22 has a heat capacity smaller than that of the front cover 14.

For this reason, the lock-up clutch mechanism according to the present embodiment is constructed to have a connecting member 36 for connecting the lock-up piston 22 with the center plate 33 of the damper mechanism 24. The connecting member 36 has a drum portion 37 extending in the axial direction C of the input shaft 13 and splined to the radially outer peripheral portion of the center plate 33, and a hollow disc plate portion 38 integrally connected with the axial end portion of the drum portion 37 and radially inwardly extending from the axial end portion of the drum portion 37. The hollow disc plate portion 38 is further in face-to-face relationship with the sliding surface 22a of the lock-up piston 22 across the lock-up piston 22. Therefore, the lock-up clutch mechanism according to the present embodiment thus constructed can be simple in construction and can increase the heat capacity of the lock-up piston 22 only with the connecting member 36 employed to connect the lock-up piston 22 with the center plate 33 of the damper mechanism 24.

As a result of this construction, the lock-up clutch mechanism according to the present embodiment can increase the absorption amount of heat generated on the sliding surface 22a of the lock-up piston 22 when the lock-up piston 22 is pressed against the front cover 14 through the multi-plate clutch 23. In other words, the lock-up clutch mechanism according to the present embodiment constructed to have three sliding surfaces including the sliding surfaces 14a, 28b, 22a can disperse the frictional heat generated on the sliding surfaces 14a, 28b, 22a to the front cover 14 and the lock-up clutch 22 even if the frictional heat is increased.

The lock-up clutch mechanism according to the present embodiment can reinforce the lock-up piston 22 with the connecting member 36 to increase the rigidity of the lock-up piston 22, and thereby can suppress the lock-up piston 22 from being deformed by the operating oil pressure in the engagement side oil chamber 40 when the lock-up piston 22 is pressed against the front cover 14 by the multi-plate clutch 23. As a consequence, the friction material 30 and the sliding surface 22a can entirely be brought into sliding contact with each other, thereby making it possible to promptly transmit to the connecting member 36 the heat generated on the sliding surface 22a.

This means that the heat generated on the sliding surface 22a can be suppressed from being raised, thereby making it possible to enhance the heat resistance of the friction material 30 as well as to prevent the friction material 30 from being deteriorated earlier.

Further, the lock-up clutch mechanism according to the present embodiment can reinforce the lock-up piston 22 with the connecting member 36 to prevent the lock-up piston 22 from being deformed, and thereby can make unnecessarily the rigidity of the lock-up piston 22 to be increased by a method of increasing the thickness of the lock-up piston 22, and can prevent the weight of the lock-up piston from being increased. This leads to the fact that the lock-up clutch device 18 can not only be lightened but also be reduced in production cost.

In addition, the lock-up clutch mechanism according to the present embodiment can increase the rigidity of the lock-up piston 22, thereby enabling the sliding surface 29a of the friction material 29A and the sliding surface 14a of the front cover 14, the sliding surface 29b of the friction material 29B and the sliding surface 28b of the clutch plate 28, and the sliding surface 30a of the friction material 30 and the sliding surface 22a of the lock-up piston 22 to be entirely brought into sliding contact with one another, and thereby increasing the torque capacity of the lock-up clutch device 18.

As consequence, the slip area to allow the lock-up piston 22 to be pressed against the front cover 14 in the half-clutch state can be expanded, thereby improving the fuel consumption in the wide driving area.

The present embodiment is constructed to allow the spline portion 37a formed on the inner peripheral portion of the drum portion 37 to be splined to the spline portion 33a of the center plate 33, so that the lock-up piston 22 can reliably be moved in the axial direction C of the input shaft 13 with respect to the damper mechanism 24.

The present embodiment is further constructed to have the whole surface of the rear surface of the hollow disc plate portion 38 joined to the other side surface 22B of the lock-up piston 22 with the joining member 39, thereby resulting in the fact that the temperature of the sliding surface 22a can even further be suppressed from being raised.

While the present embodiment has been explained as being constructed with the multi-plate clutch 23 having three sliding surfaces, the multi-plate 23 may have four or more sliding surfaces according to the present invention. In this case, it is sufficient to increase the number of clutch plates and to adequately adjust the positions of the friction materials to be affixed to the clutch plates, respectively.

The multi-plate clutch may be constructed to have two sliding surfaces according to the present invention. It is sufficient to remove either one of the clutch plate 26 and the clutch plate 28, and to affix the friction materials to the both axial side surfaces of the clutch plate.

(Second Embodiment)

Figure 4:
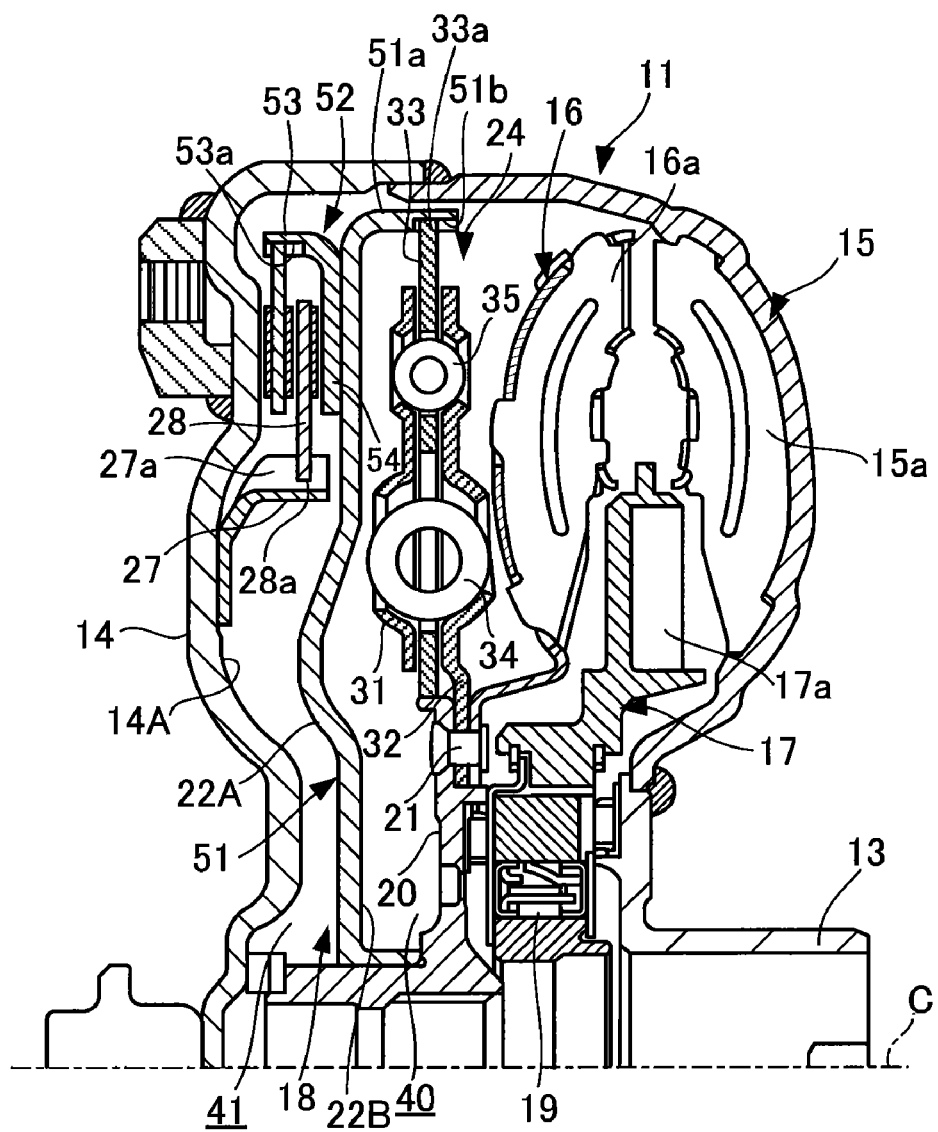
FIG. 4 shows a second embodiment of the lock-up clutch mechanism according to the present invention, and is a cross-sectional view of a torque convertor provided with a lockup mechanism.
Figure 5:
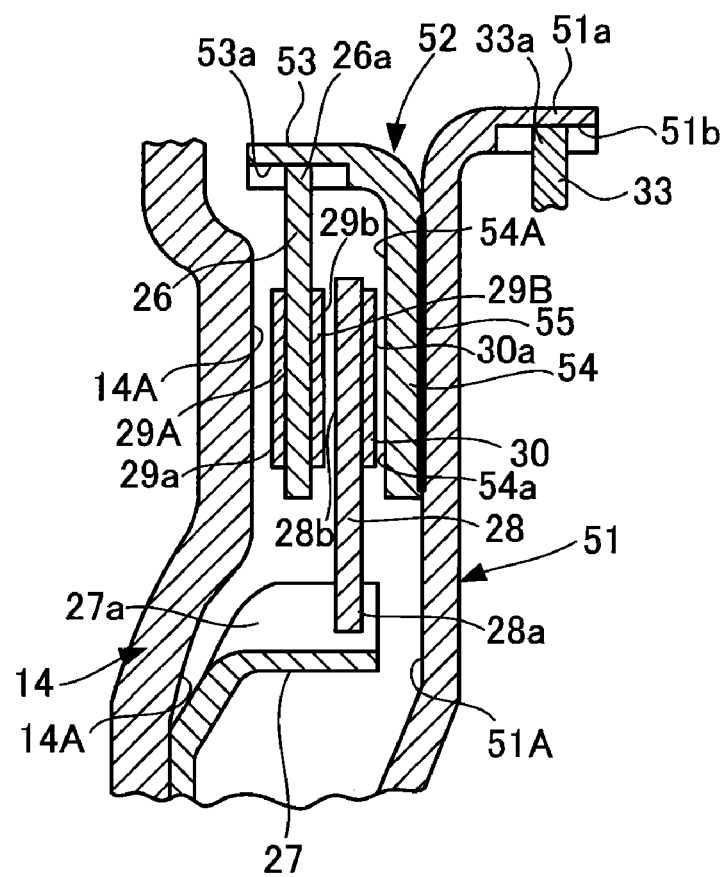
FIG. 5 shows the second embodiment of the lock-up clutch mechanism according to the present invention, and is a cross-sectional view of a multi-plate clutch forming part of the lock-up clutch mechanism.
Figure 6:
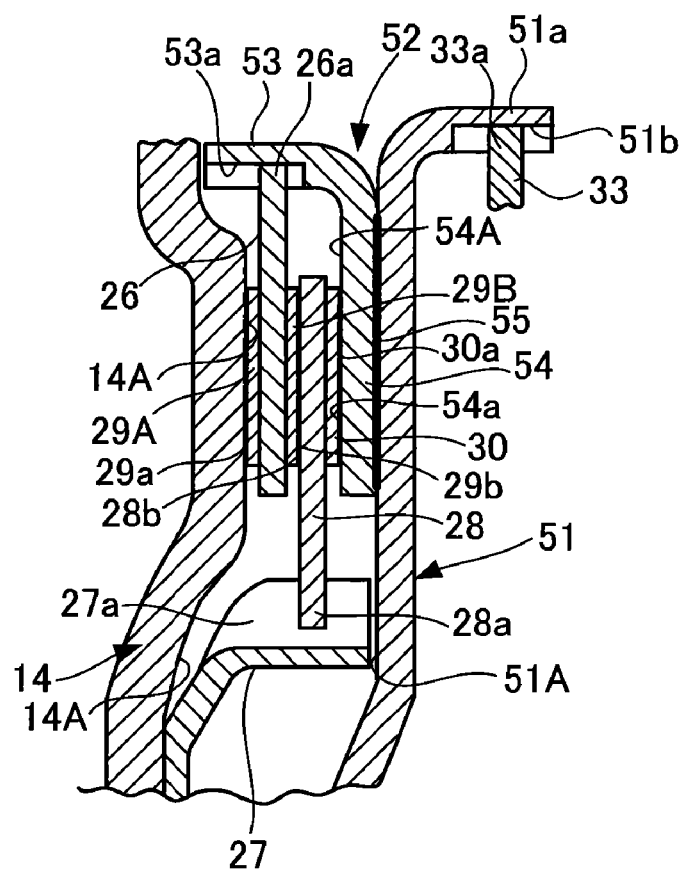
FIG. 6 shows the second embodiment of the lock-up clutch mechanism according to the present invention, and a view showing the multi-plate clutch with the lock-up clutch being pressed against a front cover.
Figure 7:
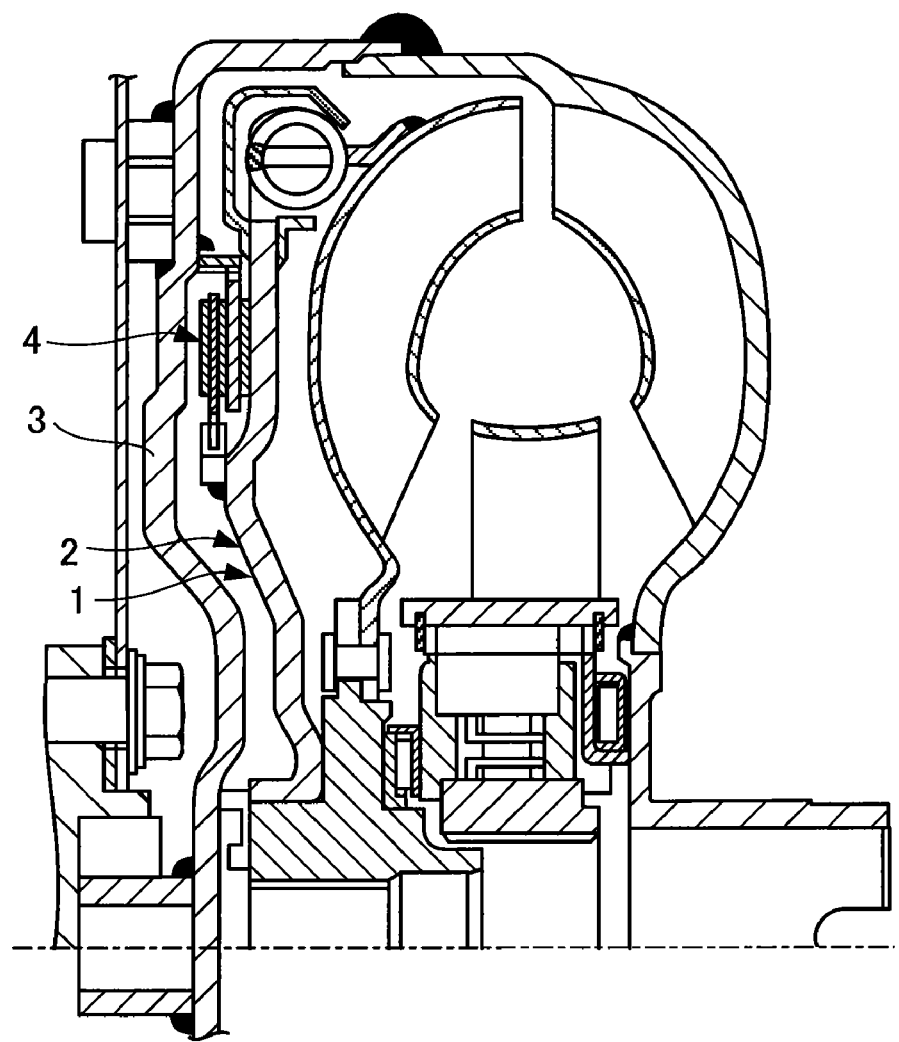
FIG. 7 is a cross-sectional view of a conventional torque convertor provided with a lockup mechanism.
Figure 8:
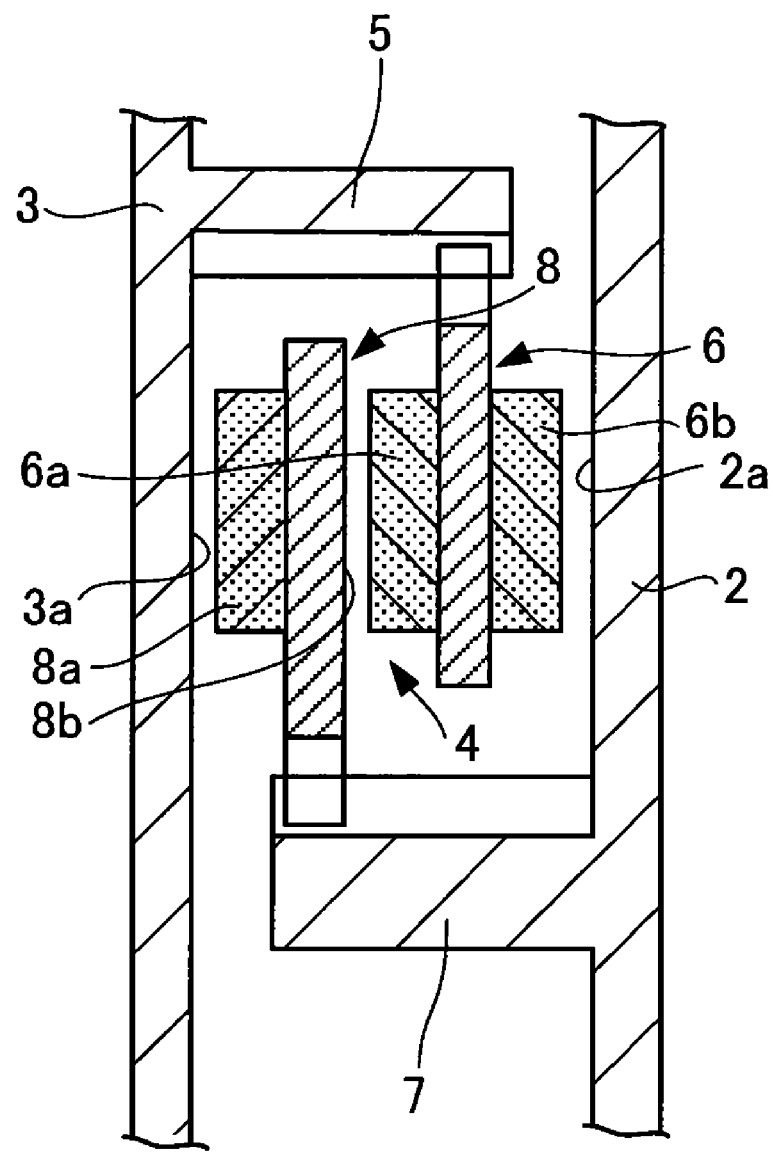
FIG. 8 is a cross-sectional view of a conventional multi-plate clutch

FIGS. 4 to 6 are views showing the second embodiment of the lock-up clutch mechanism according to the present invention. The detailed explanation of the second embodiment will be omitted with the same constitution elements and parts as those of the first embodiment being indicated to bear the same reference numerals as those of the first embodiment.

As shown in FIGS. 4, 5, the lock-up piston is formed in a disc shape and has a radially outer peripheral portion formed with an outer peripheral drum portion 51a extending in the axial direction C of the input shaft 13. The inner peripheral portion of the outer peripheral drum portion 51a is formed with a spline portion 51b to be splined to the spline portion 33a of the center plate 33, so that the lock-up piston 51 is prohibited from being relatively rotated with, viz., rotated together with the damper mechanism 24, but is only axially slidable with respect to the damper mechanism 24.

The lock-up piston 51 and the clutch plate 26 are connected with each other by a connecting member 52. The connecting member 52 has a drum portion 53 extending in the axial direction C of the input shaft 13 and forming a cylindrical portion partly forming a connecting portion. The inner peripheral portion of the drum portion 53 is formed with a spline portion 53a to be splined to the spline portion 26a of the clutch plate 26, so that the clutch plate 26 is prohibited from being relatively rotated with, viz., rotated together with the lock-up piston 51, but is only axially slidable with respect to the lock-up piston 51.

The connecting member 52 has a hollow disc plate portion 54 integrally connected with the axial end portion of the drum portion 53 and radially inwardly extending from the drum portion 53. The hollow disc plate portion 54 is joined together with the one side surface 51A of the lock-up piston 51 by a joining member 55 such as brazing, welding and other bonding materials.

The hollow disc plate portion 54 is held in face-to-face relationship with the friction material 30, and has an inner peripheral surface 54A having a sliding surface 54a forming a second sliding surface frictionally slidable with the friction material 30.

The connecting member 52 in the present embodiment is constructed to have a hollow disc plate portion 54 extending from the spline portion 53a of the drum portion 53 held in spline engagement with the spline portion 26a of the clutch plate 26 to the one side surface 51A of the lock-up piston 51 to form a sliding surface 54a frictionally slidable with the friction material 30.

As previously mentioned, the lock-up clutch mechanism according to the present embodiment is constructed to have a connecting member 52 for connecting the lock-up piston 51 with the clutch plate 26. The connecting member 52 has a drum portion 53 extending in the axial direction C of the input shaft 13 and splined to the radially outer peripheral portion of the clutch plate 26, and a hollow disc plate portion 54 integrally connected with the axial end portion of the drum portion 53 and radially inwardly extending from the axial end portion of the drum portion 53 to have a sliding surface 54a. The hollow disc plate portion 54 is joined to the one side surface 51A of the lock-up piston 51 by the joining member 55. Therefore, the lock-up clutch mechanism according to the present embodiment thus constructed can be simple in construction and can increase the heat capacity of the lock-up piston 51 only with the connecting member 52 employed to connect the lock-up piston 51 with the clutch plate 26.

As a result of this construction, the lock-up clutch mechanism according to the present embodiment can increase the absorption amount of heat generated on the sliding surface 54a of the hollow disc plate portion 54 when the lock-up piston 51 is pressed against the front cover 14 through the multi-plate clutch 23.

The lock-up clutch mechanism according to the present embodiment can reinforce the lock-up piston 51 with the connecting member 52 to increase the rigidity of the lock-up piston 51, and thereby can suppress the lock-up piston 51 from being deformed by the operating oil pressure in the engagement side oil chamber 40 when the lock-up piston 51 is pressed against the front cover 14 by the multi-plate clutch 23. As a consequence, the friction material 30 and the sliding surface 54a can entirely be brought into sliding contact with each other, thereby making it possible to promptly transmit to the connecting member 51 from the connecting member 52 the heat generated on the sliding surface 54a.

This means that the heat generated on the sliding surface 54a can be suppressed from being raised, thereby making it possible to enhance the heat resistance of the friction material 30 as well as to prevent the friction material 30 from being deteriorated earlier.

Further, the lock-up clutch mechanism according to the present embodiment can reinforce the lock-up piston 51 with the connecting member 52 to prevent the lock-up piston 51 from being deformed, and thereby can make unnecessarily the rigidity of the lock-up piston 51 to be increased by a method of increasing the thickness of the lock-up piston 51, and can prevent the weight of the lock-up piston from being increased. This leads to the fact that the lock-up clutch device 18 can not only be lightened but also be reduced in production cost.

In addition, the lock-up clutch mechanism according to the present embodiment can increase the rigidity of the lock-up piston 51, thereby enabling the sliding surface 29a of the friction material 29A and the sliding surface 14a of the front cover 14, the sliding surface 29b of the friction material 29B and the sliding surface 28b of the clutch plate 28, and the sliding surface 30a of the friction material 30 and the sliding surface 54a of the hollow disc plate portion 54 to be entirely brought into sliding contact with one another, and thereby increasing the torque capacity of the lock-up clutch device 18.

As consequence, the slip area to allow the lock-up clutch 51 to be pressed against the front cover 14 in the half-clutch state can be expanded, thereby improving the fuel consumption in the wide driving area.

The present embodiment is constructed to allow the spline portion 53a formed on the inner peripheral portion of the drum portion 53 to be splined to the spline portion 26a of the clutch plate 26, so that the clutch plate 26 can reliably be moved in the axial direction C of the input shaft 13 with respect to the lock-up piston 51.

The present embodiment is further constructed to have the whole surface of the rear surface of the hollow disc plate portion 54 joined to the one side surface 51A of the lock-up piston 51 with the joining member 55, thereby resulting in the fact that the temperature of the sliding surface 54a can even further be suppressed from being raised.

While the present embodiment has been explained with an example raised for the lock-up clutch device 18 applied to the torque convertor 11, the lock-up clutch device 18 can be applied to a fluid coupling if the fluid coupling is a fluid transmission apparatus.

The previously mentioned embodiments have been raised as examples to explain the present invention, however, the present invention is not limited to these embodiments. The scope of the present invention should be construed based on the claims but not on these embodiments. It is needless to say that the equivalents and modifications of the elements or parts defined in claims should be incorporated within the scope of the present invention.

From the foregoing description, it will be understood that the lock-up clutch mechanism according to the present invention can be simple in construction but can increase the rigidity and the heat capacity of the lock-up piston, can lighten the lock-up piston, can suppress the temperature of the second sliding surface from being raised to enhance the heat resistance of the second friction member. The lock-up clutch mechanism according to the present invention is useful as a lock-up clutch mechanism provided with a lock-up piston connected to the cover member forming part of the fluid transmission apparatus through the multi-plate clutch.

Reference Signs List

11: torque convertor (fluid transmission apparatus)
13: input shaft
14: front cover (cover member)
14a: sliding surface (first sliding surface)
15: pump impeller
16: turbine runner
18: lock-up clutch device (lock-up clutch mechanism)
22, 51: lock-up piston
22A, 51A: one side surface
22B: other side surface
22a, 54a: sliding surface (second sliding surface)
23: multi-plate clutch
24: damper mechanism
26, 28: clutch plate
29A: friction material (first friction material)
30: friction material (second friction material)
31, 32: cushion plate (first damper plate)
33: center plate (second damper plate)
36, 52: connecting member
37, 53: drum portion (cylindrical portion)
38: 54: hollow disc plate portion
39, 55: joining member

The invention claimed is:

1. A lock-up clutch mechanism provided in a fluid transmission device comprising a pump impeller connected with an output shaft of a driving source through a cover member, a turbine runner disposed in face-to-face relationship with the pump impeller and connected with an input shaft forming part of a driven side member, and a damper mechanism having a first damper plate connected with the turbine runner, and a second damper plate connected with the first damper plate through a resilient member and relatively rotatable with the first damper plate in the state of the resilient member compressed, the lock-up clutch mechanism intervening between the cover member and the second damper plate and comprising:

a lock-up piston formed in a disc shape and movable toward and away from the cover member in the axial direction of the input shaft, a multi-plate clutch disposed between a first sliding surface formed on the inner peripheral surface of the cover member and a second sliding surface formed on one side surface of the lock-up piston, the multi-plate clutch having one or more clutch plates including a first friction member frictionally slidable with the first sliding surface and a second friction member frictionally slidable with the second sliding surface, the multi-plate clutch being formed with no less than two sliding surfaces between the one side surface of the lock-up piston and the inner peripheral surface of the cover member, and a connecting member for connecting the lock-up piston and the second damper plate, the connecting member having a connecting portion connected with the second damper plate and extending from the connecting portion to the other side surface of the lock-up piston, and the connecting member being partly in face-to-face relationship with the second sliding surface across the lock-up piston, wherein the connecting member has a cylindrical portion extending in the axial direction of the input shaft to partly constitute the connecting portion splined to the radially outer peripheral portion of the second damper plate, and a hollow disc plate portion integrally formed with the axial end portion of the cylindrical portion and radially inwardly extending from the axial end portion of the cylindrical portion, the hollow disc plate portion being in face-to-face relationship with the second sliding surface across the lock-up piston.

2. The lock-up clutch mechanism as set forth in claim 1, wherein the whole surface of the hollow disc plate portion is joined to the other side surface of the lock-up piston by a joining member.

3. A lock-up clutch mechanism provided in a fluid transmission device comprising a pump impeller connected with an output shaft of a driving source through a cover member, a turbine runner disposed in face-to-face relationship with the pump impeller and connected with an input shaft forming part of a driven side member, and a damper mechanism having a first damper plate connected with the turbine runner, and a second damper plate connected with the first damper plate through a resilient member and relatively rotatable with the first damper plate in the state of the resilient member compressed, the lock-up clutch mechanism intervening between the cover member and the second damper plate and comprising:

a lock-up piston formed in a disc shape and movable toward and away from the cover member in the axial direction of the input shaft, a multi-plate clutch disposed between a first sliding surface formed on the inner peripheral surface of the cover member and a second sliding surface formed on one side surface of the lock-up piston, the multi-plate clutch having one or more clutch plates including a first friction member frictionally slidable with the first sliding surface and a second friction member frictionally slidable with the second sliding surface, the multi-plate clutch being formed with no less than two sliding surfaces between the one side surface of the lock-up piston and the inner peripheral surface of the cover member, and a connecting member for connecting the lock-up piston and at least one or more clutch plates, the connecting member having a connecting portion connected with the clutch plate and extending from the connecting portion to the one side surface of the lock-up piston to form the second sliding surface frictionally slidable with the second friction member, wherein the connecting member has a cylindrical portion extending in the axial direction of the input shaft partly to constitute the connecting portion splined to the radially outer peripheral portion of at least one or more clutch plates, and a hollow disc plate portion integrally formed with the axial end portion of the cylindrical portion and radially inwardly extending from the axial end portion of the cylindrical portion to have the second sliding surface.

4. The lock-up clutch mechanism as set forth in claim 3, wherein the whole surface of the hollow disc plate portion is joined to the one side surface of the lock-up piston by a joining member.

5. The lock-up clutch mechanism as set forth in claim 3, wherein the connecting member is splined to the clutch plate having the first friction member.

* * * * *